United States Patent [19]

Wood

[11] 4,385,885

[45] May 31, 1983

[54] LINING OF PASSAGEWAYS

[75] Inventor: Eric Wood, Ossett, England

[73] Assignee: Insituform International, Inc., Jersey, Channel Islands

[21] Appl. No.: 239,962

[22] Filed: Mar. 3, 1981

[30] Foreign Application Priority Data

Mar. 7, 1980 [GB] United Kingdom ............... 8007877

[51] Int. Cl.³ .................... B29C 17/07; B32B 1/10
[52] U.S. Cl. ................... 425/387.1; 156/287;
156/294; 156/423; 264/36; 264/516; 425/11
[58] Field of Search ............ 264/516, 269, 36;
425/503, 11, 387.1; 156/287, 294, 423; 198/624

[56] References Cited

U.S. PATENT DOCUMENTS 2,608,405 8/1952 Salfisberg et al. ............. 198/624 X
3,132,062 5/1964 Lang et al. ..................... 156/287
4,064,211 12/1977 Wood ............................. 264/516

FOREIGN PATENT DOCUMENTS 153660 1/1951 Australia ........................... 198/624

Primary Examiner—Jan H. Silbaugh
Attorney, Agent, or Firm—David A. Jackson

[57] ABSTRACT

The invention provides that a flexible liner is everted into a passageway to line same using liquid under pressure. The liner is fed through an enclosure before it everts and eversion is achieved by pressurization of the liquid in the enclosure. The feed of the liner through the enclosure is preferably controlled by the drivable feed rollers through a nip of which the liner passes. The rollers preferably have projections which engage the liner positively to engage the liner. The invention has particular applicability to the placement of liners which although flexible and evertible when being installed, set hard when in position lining the passageway.

3 Claims, 3 Drawing Figures

LINING OF PASSAGEWAYS

This invention relates to the lining of passageways such as sewers, tunnels, the interior of pipelines and the like.

In our British Patent Specification No. 1,449,455, we have set forth a method of lining a substantially horizontal passageway wherein a flexible tubular liner is applied to a passageway by the rolling of the liner into the passageway from one end thereof using a fluid pressure differential to move the liner into the passageway and to evert it. The tubular liner is defined as being part of a composite tubular laminate including a tube of resin absorbent material such as flexible foam, felt and/or cloth or a combination of such materials which is wetted out with resin, and a fluid impermeable coating, foil or membrane which surrounds the tube of absorbent material, and the resin is allowed to cure whilst the line is held in position, after eversion and lining the passageway.

In the said prior patent specification, we have described simply the pouring of liquid into the everted liner to establish a gravity head in order to force it to evert along the passageway. For very long small diameter passageways to be lined, and hence the utilisation of very long tubular liners, it is difficult to practice the said method because a large head of water is required to evert the tubular liner, which is heavy because of the contained resin.

The present invention was made primarily for the eversion of linings (as described) above into passageways to overcome the aforesaid difficulty, but, as will be clear from the following, the invention can be used for everting any form of liner into a passageway.

In accordance with the present invention, the liquid which is performing the eversion of a tubular liner into a passageway is contained within means defining an enclosure and that closure is pressurised in order to effect the eversion, thereby removing the need to have a large gravity head, the liner is fed through the enclosure and is engaged by drivable roller means to control the feeding of the liner into the passageway. The said roller means may be contained within the enclosure.

The said roller means may comprise two rollers defining a nip through which the liner passes. The said rollers preferably have interengaging teeth or projections, whereby the liner may be positively engaged and drawn into the enclosure, said teeth preventing migration to the rear of the roller nip of the resin contained in the liner. The driving of the liner by means of the rollers may be such as to ensure that the liner is maintained under a slight tension between where it is everting and where it leaves the roller nip.

The liner may travel into the enclosure through a suitable seal, and the enclosure may have a pressure relief valve to control the pressure inside the enclosure.

The pressure in the enclosure may be maintained by a small centrifugal pump, and any liquid discharged through said relief valve, when open, may be discharged into a sump cavity into which make up water is charged, and from which the centrifugal pump draws its supply.

The said rollers may be hand driven by a crank or may be driven by a small electric motor through suitable gears and the motor may also serve to drive the pump.

This arrangement constitutes an extremely effective method (not requiring a large gravity liquid head) of inserting tubular liners which are as described in said British Pat. No. 1,499,455, which are wetted out with resin, also as explained in said British Patent Specification, and which are of small diameter.

The invention also provides an apparatus for everting a flexible tubular liner into a passageway comprising an enclosure into which the liner can be passed, and from which the liner may be everted into a passageway by pressurizing liquid inside the enclosure, means for pressurizing the interior of the enclosure, roller means for engaging and augmenting the pressurising for the feed of the liner into the passage.

Preferably, the roller means comprises two rollers defining a nip, and preferably said rollers are located inside the enclosure.

An embodiment of the invention will now be described, by way of example, with reference to the accompanying drawings, wherein.

Figure 1:
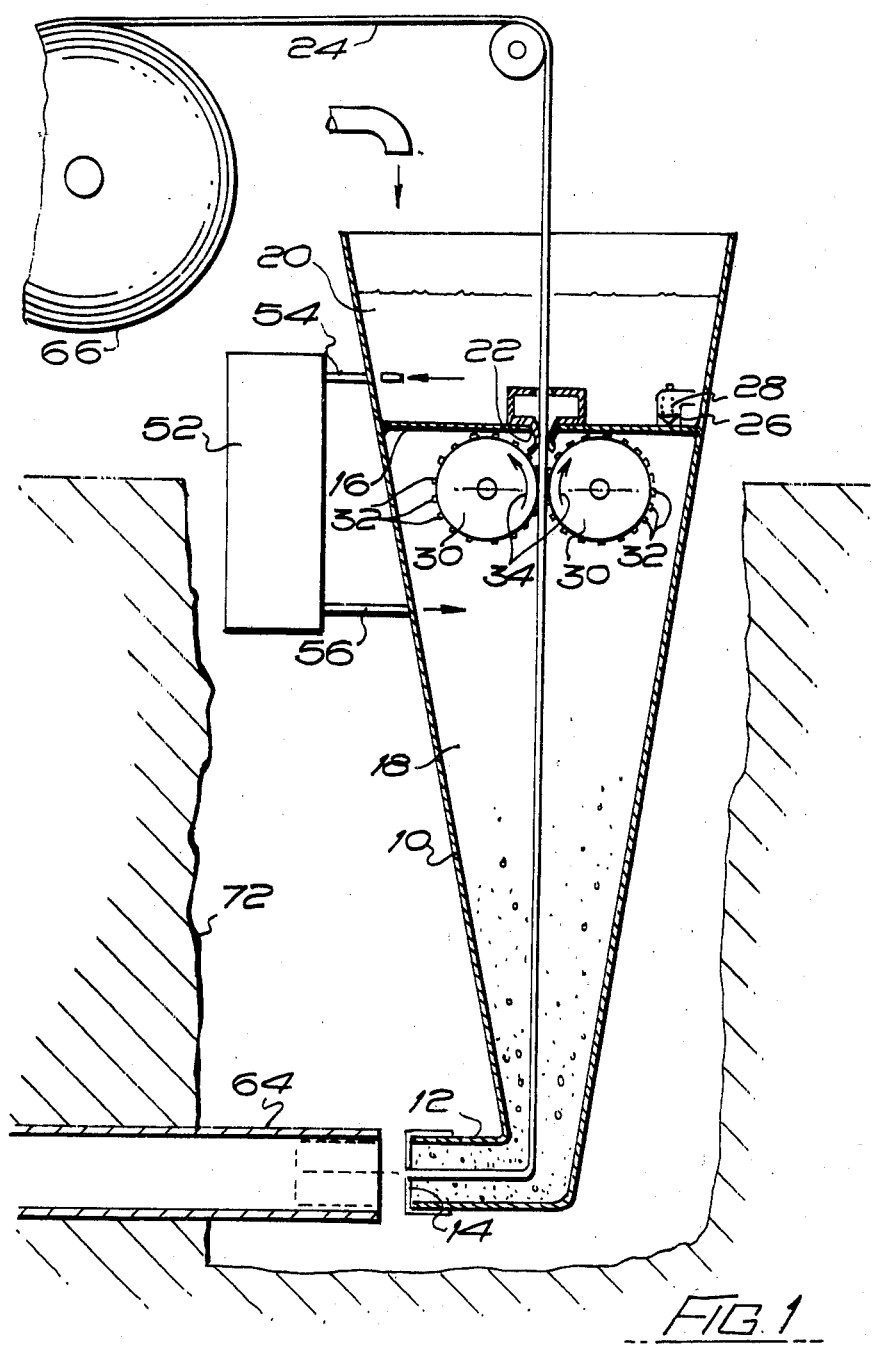
FIG. 1 shows a diagrammatic sectional elevation of apparatus in accordance with and usable in accordance with the present invention.

Referring to FIG. 1, in this drawing there is shown a conical casing 10, disposed with its larger end uppermost, and at the bottom of the casing is an elbow formation 12 having an outlet 14. Inside the casing 10 towards the upper end thereof is a partition 16 which splits the casing 10 into an enclosure 18 and an upper filling cavity 20. The partition 16 is provided with a lip seal arrangement 22 through which a tubular liner 24 passes in a sealing fashion. The end of the tubular liner is, as shown, turned back upon itself and over the outlet 14 of the elbow 12.

Figure 2:
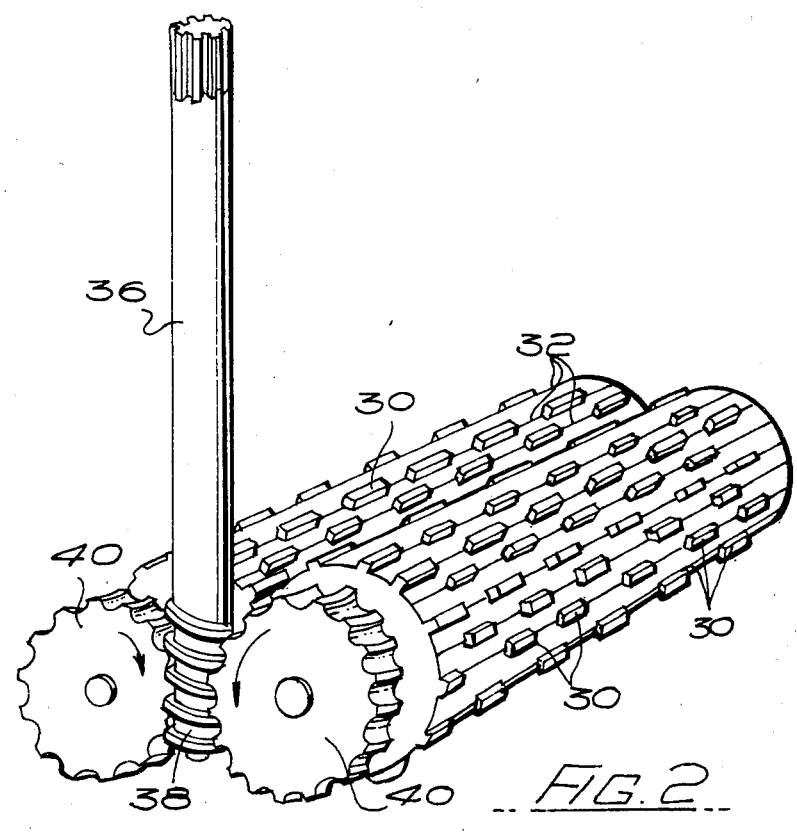
FIG. 2 is a diagrammatic perspective and enlarged view showing the drive connection to the feed rolls shown in FIG. 1.

The partition 16 is furthermore provided with a relief valve assembly bearing 26 in which is slidably and sealingly located a relief valve 28. Inside the enclosure 18 is a roller drive means in the form of a pair of drive rollers 30 having projecting teeth 32. The teeth 32 are arranged in axial rows and alternate with spaces in each row, the teeth of adjacent rows are staggered as shown in FIG. 2. the rollers 30 co-operate to define a nip through which the liner passes. The roller nip engages the liner and rotation of the rollers 30 as shown by the arrows 34 effects pulling of the liner 24 into the enclosure 18, the teeth 32 serving in this respect as a positive liner grip means, which, because of the spacing of the teeth ensures that if, as is usual the liner contains resin, the resin will not be held back at the nip between the rollers 30. The rollers 30 are driven by an electric motor (not shown) which drives a vertical shaft 36 located outside the enclosure 18 and the said shaft 36 (FIG. 2) has a spiral gear 38 at the lower end which engages corresponding spiral gears 40 at the ends of the shafts carrying rollers 30. In an alternative construction, the rollers are adapted to be rotated manually by means of a crank engageable with one of the rollers outside the enclosure, the rollers being geared together so that they will rotate in sychronism.

Figure 3:
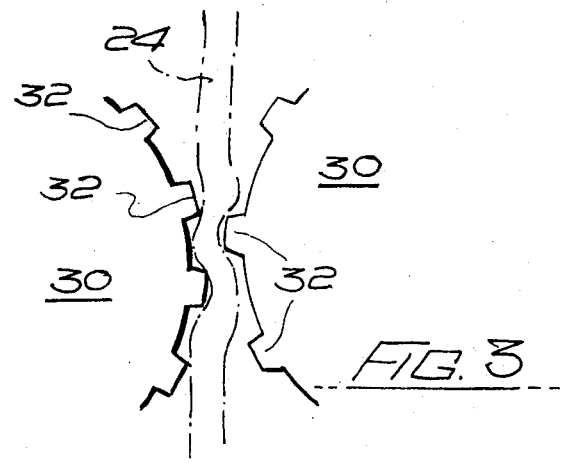
FIG. 3 is a diagrammatic side view, to an even larger scale, showing how the roller teeth engage the liner.

A pump 52 serves to pressurize liquid inside the enclosure by pumping the liquid through pipe 56, the liquid being drawn from cavity 20 through pipe 54. In use, the lining is fed through the enclosure 18 when empty, until it is engaged by the nip of rollers 30 which are driven as indicated by the arrows, until the end can be turned back and clamped as shown in FIG. 1. FIG. 3 shows how the liner is engaged by the teeth 32 so as to be positively driven until the end of the lining can be clamped. The rollers are stopped whilst the liner end is clamped.

To perform the eversion, the pump 52 is operated to pressurize the interior of the enclosure with water, and at the same time the rollers 30 are driven. The enclosure pressure and the rate of drive of the rollers 30 are such that the liner is maintained under slight tension, and the rollers in fact hold the lining back. These conditions are maintained until the liner has been completely everted into the passageway.

The invention can be used for tubular liners of any construction, but it is particularly suitable for inserting tubular liners which are flexible whilst they are being inserted by the method as described, but which because of their composition become hard rigid lining pipes. Such a construction results for example when the liner is basically a tube of absorbent felt material which is impregnated with a curable resin. As the liner to be everted is provided with an outer impermeable coating or film there will be no contact between the everting liquid and the resin. When the liner is in position in the passageway, it is held to the passageway surface by the liquid under pressure until such times as the resin cures and the liner becomes free standing.

In the arrangement shown in FIG. 1, the apparatus is used for the lining of an underground pipeline 64, suitable excavation having been made as shown at 72. The apparatus can be used to handle any length of liner, and the liquid which is chosen for the eversion will be related to the specific gravity of the liner and any resin contained therein, so that the portion of the liner which travels along the passageway 64 before eversion, is buoyantly supported by the liquid performing the eversion.

I claim:

1. Apparatus for everting a flexible tubular liner into a passageway comprising:
    A. an enclosure having a top, a bottom and a partition proximate and extending generally transverse to said top;
    B. an entry port adjacent said top through which said lining can be fed in a sealing fashion into said enclosure;
    C. an exit port at said bottom to which an end of said lining can be attached;
    D. a pressurizing chamber defined by said enclosure adapted to develop fluid pressure to assist in everting said lining out of said exit port through an end of said lining attached at said exit port;
    E. roller means located in said pressurizing chamber adapted to engage and advance said liner for the controlled eversion of said liner into said passageway; and
    F. an upper filling cavity located above and in fluid communication with said pressurizing chamber and defined in part by said partition, said upper filling cavity adapted to receive and hold fluid for introduction into said pressurizing chamber.

2. Apparatus according to claim 1, wherein the roller means comprises two rollers defining a nip, and said rollers are located inside the enclosure.

3. Apparatus according to claim 1 or 2, wherein the roller surfaces have spaced teeth to provide a positive means of engaging and driving liner, said teeth being arranged in rows axially of the rollers, and alternating with spaces between the teeth along the rows.

* * * * *